March 18, 1952     E. L. TEDESCHI     2,589,747
EMERGENCY PORTABLE LIGHT
Filed July 16, 1949     2 SHEETS—SHEET 1
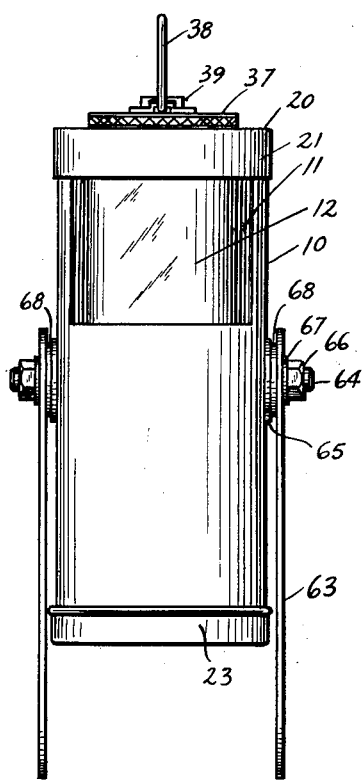
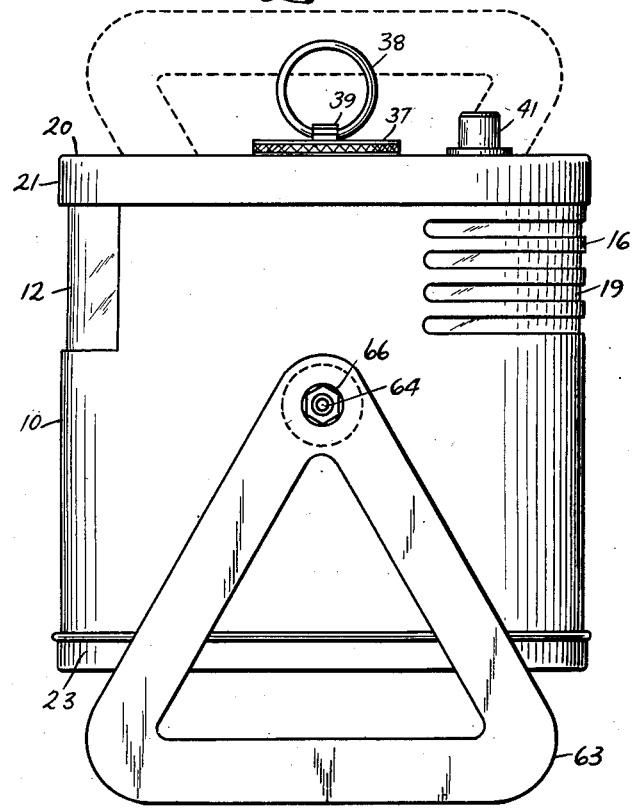
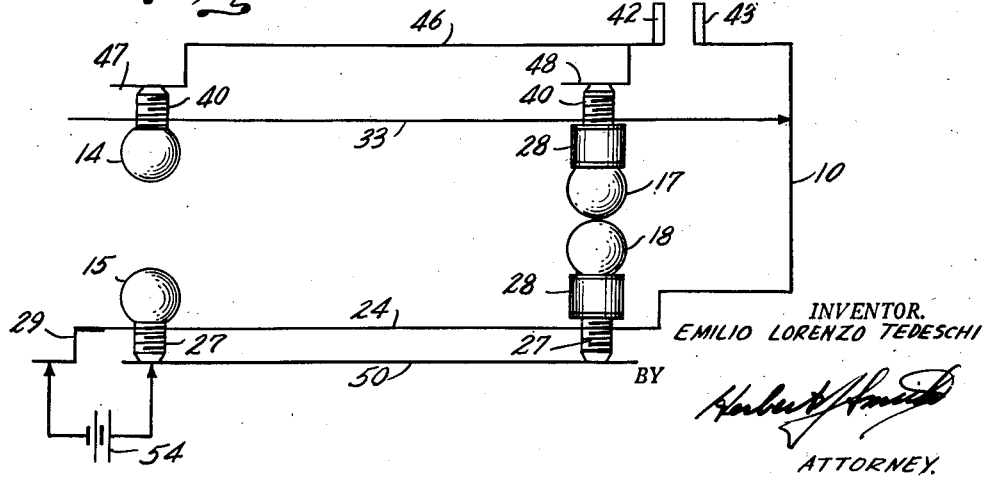
INVENTOR.
EMILIO LORENZO TEDESCHI
BY
ATTORNEY.

March 18, 1952 E. L. TEDESCHI 2,589,747
EMERGENCY PORTABLE LIGHT
Filed July 16, 1949 2 SHEETS—SHEET 2

INVENTOR.
EMILIO LORENZO TEDESCHI
BY
ATTORNEY.

Patented Mar. 18, 1952

2,589,747

UNITED STATES PATENT OFFICE 2,589,747

EMERGENCY PORTABLE LIGHT

Emilio Lorenzo Tedeschi, New York, N. Y.

Application July 16, 1949, Serial No. 105,177

5 Claims. (Cl. 177—329)

This invention pertains to a portable electrically operated device which may be used by motorists as a warning signal and utility or trouble light.

A serious cause of highway accidents is due to vehicles being stalled on highways at night time, which frequently results in rear end collisions, causing loss of life and limb. It is, therefore, an object of this invention to provide a portable warning signal and utility light which may be placed to the rear of the stalled vehicle on the highway, the portable light having a flashing red warning signal positioned to face the oncoming motorists approaching from the rear of the vehicle, and also to provide a trouble light which will be constantly illuminated and directed toward the stalled vehicle.

It is a further object of the invention to provide an electrically operated portable light which has a flashing warning signal and a continuously operated light, both of which may be connected to operate from the battery of the stalled vehicle, and a second set of lights comprising an intermittent warning signal and a continuously operated light which may be operated from a battery contained within the portable device.

A further object of the invention is to provide a portable warning and utility light which has two complete sets of warning and utility lights, either or both of which may be simultaneously operated, one set of warning lights being operable by an external source connected to the portable device by an extension cord, and the other set of warning and utility lights being operable by a source of energy such as a battery, contained within the portable device.

A further object of the invention is to provide a portable electrically operated device of the class set forth having two lights in each set, one of said lights being intermittent and the other of said lights being continuously operable, with all of the lights in both sets being interchangeable as an emergency or protective measure.

A further object of the invention is to provide a portable warning and utility light combination within a single housing and having means for flashing two of the warning lights, which flashing devices are of like capacity for the purpose of interchangeability one with the other as an emergency precaution.

A further object of the invention is to provide a portable warning signal and utility light which is simple in construction, efficient in operation, readily operable, and which has readily accessible means for providing a source of energy for operating said portable device contained within said device, and means for connecting said device to an external source of energy.

Further and other objects of the invention may be and may become apparent from a perusal of the present disclosure herewith, and it is to be understood that changes and modifications may be made in the device without departing from the spirit of the subjoined claims.

In the drawings:

Fig. 1 is a side view of the combination warning and utility light having the device suspended on a pair of stands which are pivotally mounted on the casing and may be swung to the position shown dotted for the purpose of carrying the device.

Fig. 2 is an end view of the device showing the open face of the utility light on one end thereof.

Fig. 5 is a wiring diagram.

Figure 3:
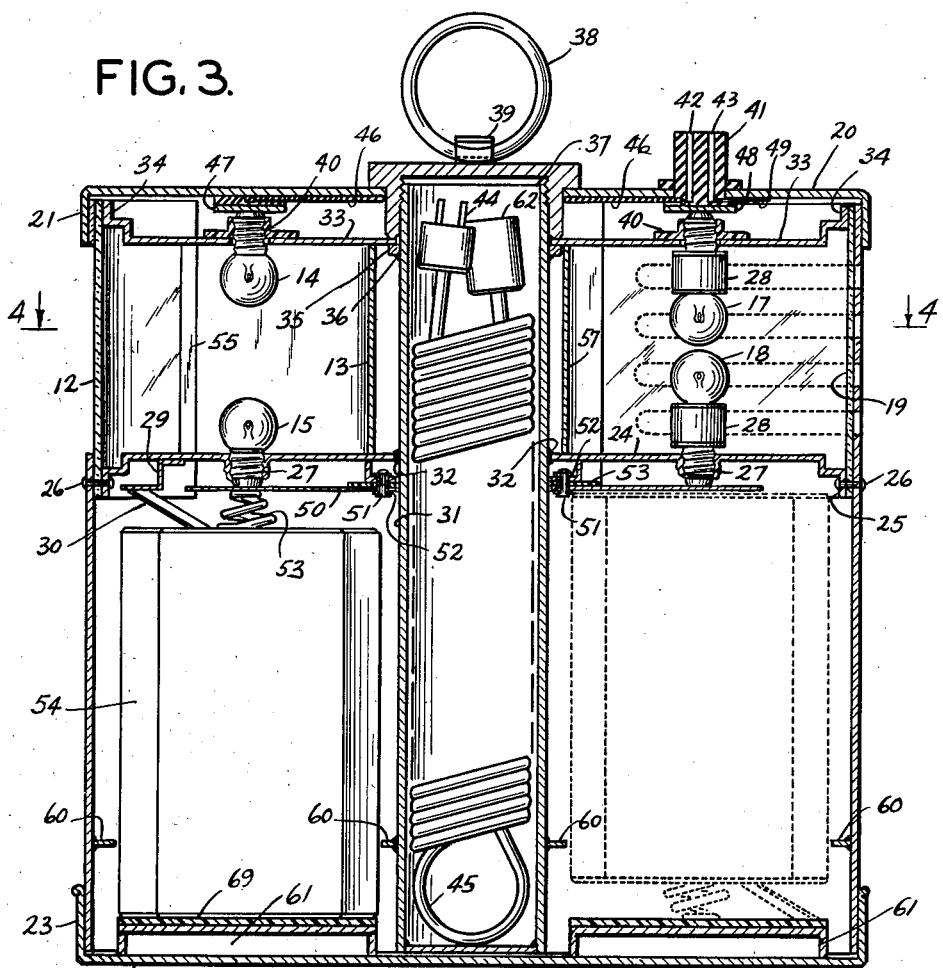
Fig. 3 is a cross sectional view of the unit to show the relative position of the parts and the electrical connections therein for connecting either to the battery carried within the device or the external source of energy which may be connected by the extension cord shown within the device.
Figure 4:
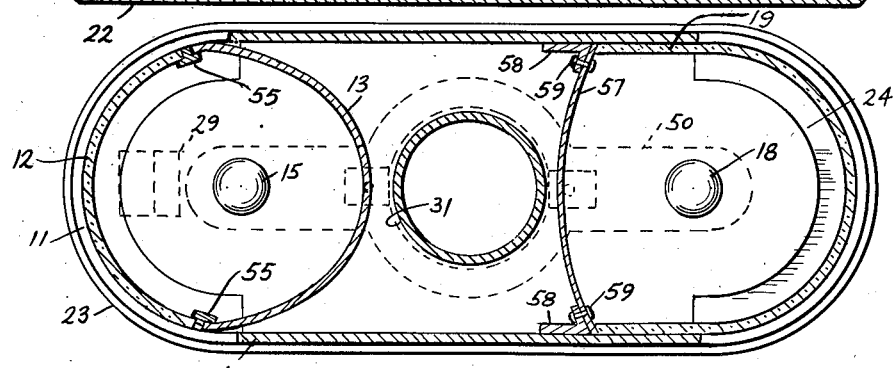
Fig. 4 is a partial sectional view taken substantially along lines 4—4 of Fig. 3 to show the relative position of the parts and their means of assembly.

Referring to the drawings, there is shown a casing 10 having an opening 11 on one end thereof with a transparent lens 12 having a reflector 13 mounted within the casing to reflect the light from either the upper bulb 14 or the lower bulb 15, so that it will reflect the light from either bulb 14 or 15 through the lens 12 so that the light therefrom may be reflected toward the vehicle.

The opposite end of the portable device has a plurality of parallel slats to provide louvres for the intermittent flashing lights such as from the upper intermittent bulb 17 or the lower intermittent bulb 18. A lens 19, which may be red in color and transparent, is disposed against the louvres or slats and secured to the casing 10.

A cover 20 has a lip 21 formed about the peripheral edge thereof and engages the upper peripheral edge of the casing 10 to form a closure for the portable device. A base 22 has a lip 23 formed thereon to engage the sides of the lower edge of the casing 10, forming a closure for the portable device.

A mid-deck 24 made of metal has a flange 25 formed on opposing ends thereof, which engages the lower edge of the lenses 19 and 12 and is secured to the casing by any suitable means such as rivets 26. The mid-deck is secured within the casing and has socket portions 27 formed therein to receive the bulb 15 and the lower flasher unit 28.

A Z-shaped contact 29 is secured adjacent one end of the mid-deck and is a contact for engaging one of the resilient members such as 30 formed as part of the battery.

An extension cord receptacle 31 is a tubular member disposed centrally in a vertical position within the casing and passes through the mid-deck 24 and is secured thereto by any convenient means, such as by a weld shown at 32.

An upper deck 33 has flanges 34 formed on opposing ends thereof in much the same manner as the flanges formed on the mid-deck, said flanges being adaptable to engage the upper edge of the lenses 12 and 19 to act as a retainer therefor by urging said lenses against the inner surface of the casing. A ring 35 is placed over the tubular member and is welded thereto by a weld 36, which ring acts as a limiting means and a support for the upper deck 33.

A closure 37 is adapted to fit through a central aperture in the cover so that it threadedly engages the upper end of the tubular receptacle 31 and presses against the upper surface of the ring 35 for upper deck 33 which bears against the ring 35 for the purpose of holding the upper deck 33 in position when the cover 20 is placed thereon. A ring 38 is swingably mounted in a bracket 39 to the closure 37 to facilitate in the removal of said closure.

It will be seen that if it is necessary to change any of the bulbs of either of the flasher units 28, the closure 37 may be unscrewed and the cover 20 and the upper deck 33 removed to permit entry into the compartment containing the bulbs. Sockets 40 are secured to the upper deck 33 which is formed of metal and acts as a common electrical conductor with the casing 10. The metallic shell of bulbs 14 and 17 will at all times beat ground potential with the casing 10.

A female socket 41 has electrical conductors 42 and 43 therein which may receive the terminals such as 44 of the extension cord 45. The terminal 42 is connected by a conductor 46 to a metallic plate 47 to provide one terminal for the bulb 14. Conductor 42 is also connected to a plate 48 to provide a terminal for the upper flasher unit 28. The terminal 43 is grounded to the casing by a rivet 49.

A contact strip 50 is connected by rivets 51 to flanges 52 which are formed from or secured to the mid-deck 24. A piece of insulation material 53 is disposed between each of the flanges 52 and the contact strip 50 and the rivet 51 is also insulated by a sleeve 52 of insulating material. While the contact strip 50 is connected to the mid-deck mechanically, it is electrically insulated therefrom and is spaced from the extension cord receptacle 31 so that there is no electrical contact therebetween; it is also noted that the contact strip 50 does not engage the casing 10 in any manner and has its only electrical contact with the resilient spring 53' of the battery 54. The contact strip 50 is a common terminal for the end contact of the bulb 15 and the lower flasher unit 28.

A bracket 55, which has a cross sectional T-shape, is secured to the casing 10 between the upper deck 33 and the mid-deck 24, so that the lens 12 may have its outer edges fit under one side of the bracket and the reflector 13 which is secured between the upper deck and the mid-deck may have its vertical free edges secured by one side of the bracket 55.

A reflector 57, disposed for reflecting the light from the flasher bulbs, is secured to brackets 58 by rivets 59, which brackets 58 are secured to the casing 10. The vertical free edges of the lens 19 engage the reflector to assist in positioning same. However, it may be desirable to use rivets or other fastening means to assist in positioning the reflector 57. Spacers 60 are welded to the extension cord receptacle 31 and the casing 10 to assist in centrally positioning the battery such as 54. The base 22 has a pair of raised portions 61 with an insulating member 69 on the top thereof. The spare battery, shown dotted, is normally resting in the position shown dotted when this spare battery is not in use.

When it is desired to use the battery as a means of lighting the bulbs 15 and 18, the battery shown on the left side of Fig. 3 is positioned as shown in solid lines by removal of the base 22 from the casing and reversing the position of the battery so that it rests as shown in Fig. 3 in solid lines.

It will be seen that there is no switch necessary with the present construction, thereby eliminating any possibility of mechanical failure due to a faulty switch. The elimination of a switch not only reduces the cost of the device in manufacture, but also eliminates a possible source of trouble from the electrical operating standpoint.

When it is desired to use the lights on the upper deck of the portable device, the extension cord is removed from its receptacle and plugged into the socket of the portable device with the opposing end of said extension cord being connected to any convenient outlet of the automobile such as the cigarette lighter on the dashboard of the car, or it may be directly connected by means of clips, to the battery in lieu of using the plug 62. A triangular shaped stand 63 is disposed on either side of the portable device and is connected thereto by studs 64, which studs are each secured to a boss 65 connected to the casing with nuts and washers 66 and 67. A spacer 68 is placed between the stand and the boss to permit the stand to be spaced from the casing.

From the foregoing it will be seen that the present invention provides the motorist with a portable trouble lamp and warning signal. The trouble lamp may be used as a spotlight and the warning lamp may provide a flashing red signal to the rear of the vehicle for the purpose of avoiding rear end collisions at night time. Two sources of energy are possible with the portable electrically operated device as presented herein. There is interchangeability of all four of the bulbs used since they are of the same candle power and have similar bases, and there may be also changeability of the flasher units such as 28. Since only two of the four bulbs must be in working order and since a spare battery compartment is provided, the flexibility of the device provides spare parts of the battery, bulb, and flasher units.

What is claimed as new and desired to be secured by Letters Patent of the United States is:

1. An electrically operable portable utility and warning device having a casing with lens apertures on opposing ends thereof, lens means disposed to cover said lens apertures, a mid-deck having a central aperture and a plurality of threaded apertures formed therein and means formed thereon being adapted to engage the lower edges of both of said lenses to secure same in position in said casing, a contact strip secured to said mid-deck and electrically insulated therefrom, an upper deck having a central aperture and a plurality of threaded apertures connected thereto, means on said upper deck for securing the upper edge of said lenses in their respective positions, a metallic receptacle disposed through the central apertures in the upper deck and the mid-deck and electrically connected thereto, a base frictionally secured to the lower portion of said casing forming a plurality of battery receiving compartments below said mid-deck, a cover having a central aperture therein adapted to frictionally engage the upper edge of said casing, a closure insertable through the central aperture in said cover and being threadedly connectable to the upper end of said metallic receptacle, a female socket secured to said cover and being electrically connected to said casing, and means secured to said cover and electrically insulated therefrom to provide contact means for electrical fixtures threadedly connected to said upper deck.

2. An electrically operable portable device having a casing with a lens aperture on one end thereof and a plurality of louvres formed on the other end thereof, a crystal transparent lens disposed to cover said lens aperture, and a colored transparent lens disposed to cover the apertures formed by said louvres, a mid-deck having a central aperture and a plurality of threaded apertures formed therein and flange means formed thereon, said flange means being adapted to engage the lower edges of both of said lenses to secure same in position in said casing, a contact strip secured to said mid-deck and electrically insulated therefrom, an upper deck having a central aperture and a plurality of threaded apertures connected thereto, flange means on said upper deck for securing the upper edge of said lenses in said respective positions, a metallic receptacle disposed through the central apertures in the upper deck and the mid-deck and electrically connected thereto, a base frictionally secured to the lower portion of said casing forming a plurality of battery receiving compartments below said mid-deck, a cover having a central aperture therein adapted to frictionally engage the upper edge of said casing, a closure insertable through the central aperture in said cover and being threadedly connectable to the upper end of said metallic receptacle, a female socket secured to said cover and being electrically connected to said casing, means secured to said cover and electrically insulated therefrom to provide contact means for electrical fixtures threadedly connected to said upper deck, and means pivotally connected to said casing for supporting said casing and to provide carrying means therefor.

3. An electrically operable portable utility and warning device having a casing with a lens aperture on one end thereof and a plurality of louvres formed on the other end thereof, a lens disposed to cover said lens aperture, and a lens disposed to cover the apertures formed by said louvres, a mid-deck having a central aperture and a plurality of threaded apertures formed therein and flange means formed thereon, said flange means being adapted to engage the lower edges of both of said lenses to secure same in position in said casing, a contact strip secured to said mid-deck and electrically insulated therefrom, an upper deck having a central aperture and a plurality of threaded apertures connected thereto, flange means on said upper deck for securing the upper edge of said lenses in their respective positions, a metallic receptacle disposed through the central apertures in the upper deck and the mid-deck and electrically connected thereto, a base frictionally secured to the lower portion of said casing forming a plurality of battery receiving compartments below said mid-deck, a cover having a central aperture therein adapted to frictionally engage the upper edge of said casing, a closure insertable through the central aperture in said cover and being threadedly connectable to the upper end of the said metallic receptacle, a socket secured to said cover and being electrically connected to said casing, means secured to said cover and electrically insulated therefrom to provide contact means for electrical fixtures threadedly connected to said upper deck, and a pair of stands connected to said casing to provide means for supporting said casing.

4. An electrically operable portable device having a casing with a lens aperture on one end thereof and a plurality of louvres formed on the other end thereof, a lens disposed to cover said lens aperture, and a lens disposed to cover the apertures formed by said louvres, a mid-deck having a central aperture and a plurality of threaded apertures formed therein and flange means formed thereon, said flange means being adapted to engage the lower edges of both of said lenses to secure same in position in said casing, a contact strip secured to said mid-deck and electrically insulated therefrom, an upper deck having a central aperture and a plurality of threaded apertures connected thereto, flange means on said upper deck for securing the upper edge of said lenses in their respective positions, a metallic receptacle disposed through the central apertures in the upper deck and the mid-deck and electrically connected thereto, to provide storage space for an extension cord, a base frictionally secured to the lower portion of said casing and spaced therefrom forming a plurality of battery receiving compartments below said mid-deck, a cover having a central aperture therein adapted to frictionally engage the upper edge of said casing, a closure insertable through the central aperture in said cover and being threadedly connectable to the upper end of said metallic receptacle, a female socket secured to said cover and being electrically connected to said casing, and means secured to said cover and electrically insulated therefrom to provide contact means for electrical fixtures threadedly connected to said upper deck.

5. An electrically operable portable utility and warning device having a casing with a lens aperture on one end thereof and a plurality of louvres formed on the other end thereof, a lens disposed to cover said lens aperture, and a lens disposed to cover the apertures formed by said louvres, a mid-deck having a central aperture and a plurality of threaded apertures formed therein and flange means formed thereon, said flange means being adapted to engage the lower edges of both of said lenses to secure same in position in said casing, a contact strip secured to said mid-deck and electrically insulated therefrom, an upper deck having a central aperture and a plurality of threaded apertures connected thereto, flange means on said upper deck for securing the upper edge of said lenses in their respective positions, a metallic receptacle disposed through the central apertures in the upper deck and the mid-deck and electrically connected thereto, a base frictionally secured to the lower portion of said casing forming a plurality of battery receiving compartments below said mid-deck, a cover having a central aperture therein adapted to frictionally engage the upper edge of said casing, a closure insertable through the central aperture in said cover and being threadedly connectable to the upper end of said metallic receptacle, a female socket secured to said cover and being electrically connected to said casing, and means secured to said cover and electrically insulated therefrom to provide contact means for electrical fixtures threadedly connected to said upper deck.

EMILIO LORENZO TEDESCHI.

REFERENCES CITED

The following references are of record in the file of this patent:

UNITED STATES PATENTS

| Number | Name | Date |
| --- | --- | --- |
| 1,952,480 | Thompson | Mar. 27, 1934 |
| 2,171,349 | Wiley | Aug. 29, 1934 |
| 2,224,742 | Muldoon | Dec. 10, 1940 |
| 2,312,649 | Kelly | Mar. 2, 1943 |
| 2,482,266 | Goshorn | Sept. 20, 1949 |